United States Patent Office 3,318,823
Patented May 9, 1967

3,318,823
POLYMERIC COMPOUNDS CONTAINING
SILICON-NITROGEN BONDS
Bernard John Aylett, 12 Park Road, Radlett, Hertfordshire, England, and George Murray Burnett, 66 Queen's Road, Aberdeen, Scotland
No Drawing. Filed May 25, 1966, Ser. No. 552,721
Claims priority, application Great Britain, Jan. 19, 1961, 2,178/61
13 Claims. (Cl. 260—2)

This application is a continuation-in-part of our application S.N. 138,611, filed Sept. 18, 1961, now abandoned.

The present invention relates to polymeric compounds containing silicon.

It is a major object of the present invention to provide a new class of polymeric compounds which contain silicon-nitrogen bonds in the polymeric chain and which have excellent thermal stability.

It is a further object of the invention to provide polymeric compounds which may be applied direct or from solution to form heat-resistant protective films and which may be used as non-inflammable fire-retardant coatings.

It is an additional object of the invention to provide a number of different processes by which the new polymeric compounds may be manufactured.

The new polymers in accordance with the invention contain alternate silylene and substituted imino groups in their polymer chains and comprise repeating units of structural formula —SiH$_2$—NR— where R represents an alkyl group containing up to six carbon atoms or an aryl group containing up to seven carbon atoms. R is preferably a straight chain alkyl group such as methyl or n-butyl or an unsubstituted aryl group such as phenyl.

The polymers of the present invention are thermally stable at temperatures up to at least 400° C. This stability is extremely surprising since previous attempts to prepare apparently closely-related polymers having an [—Si—N—] backbone have resulted in either total failure or in the production of polymers which are unstable or at best have only moderate thermal stability. Thus, for example, it has proved impossible to prepare linear polymers of the repeating structure unit —SiHR—NH— where R is an organic group, and polymers having the repeating structural unit —SiH$_2$—NH— can be formed only at low temperatures and decompose readily even at room temperature. The preparation of —SiR$_2$—NH— polymer films where R is an organic group has been reported by N. D. Cheronis (U.S.P. 2,579,417 and others) but these films tend to embrittle and crack when heated at only 200° C.

The thermally stable —SiH$_2$NR— polymers according to the present invention may be prepared conveniently by reacting a bis-(diorganoamino)-silane of formula SiH$_2$(NR$_2^1$)

where R$^1$ represents a lower alkyl group containing up to six carbon atoms of an aryl group containing up to seven carbon atoms, with a substantially equimolar proportion of a primary amine of formula RNH$_2$ wherein R is as hereinbefore defined. The reaction should be carried out in an inert environment and at a temperature between about ambient temperature and 120° C. The preferred temperature range lies between 50° and 70° C. and the preferred primary amines are methylamine, n-butylamine and aniline.

A second process by which the polymers may be prepared comprises heating an organodisilylamine of formula (SiH$_3$)$_2$NR where R represents an alkyl group containing up to six carbon atoms or an aryl group containing up to seven carbon atoms, at a temperature between about 300° and 600° C. The preferred temperature range is generally between about 350° C. and 450° C., but the most suitable temperature depends upon the length of time and conditions under which the organo-disilylamine is heated. Thus, for example, a temperature of 325° C. is adequate to form a polymer from (SiH$_3$)$_2$NPh heated in situ, but where a reactant such as (SiH$_3$)$_2$NMe is streamed through a heated tube and thus has a short residence time in the heated zone, it is necessary to raise the temperature to 525° C.

The temperatures required by this second process may be drastically reduced by reacting the organodisilylamine in the presence of a basic catalyst. The new polymers may be produced by heating an organodisilylamine (SiH$_3$)$_2$NR in the presence of the basic catalyst at a temperature between about —50° C. and 200° C., but preferred temperature at which steady controllable polymerisation takes place depends upon the steric requirement of the chosen basic catalyst. Generally, the larger the size of the catalyst, or the larger the substituent R on the organodisilylamine, the higher is the temperature required. Suitable basic catalyst include ammonia, methylamine, trimethylamine, pyridine and aniline.

A further process by which the new polymers may be prepared comprises subjecting an organodisilylamine vapour, for example, methyldisilylamine vapour, to ultraviolet radiation. The vapour pressure does not appear to be critical but the power of the irradiation is important as an increase in the radiation power increases the extent of the decomposition of the organodisilylamine.

Ultra-violet irradiation may also be used to increase the chain length of new polymers produced by other methods where the chains are terminated by silyl groups.

Another process for the production of —SiH$_2$NR— polymers comprises reacting silylene di-iodide with a primary amine in accordance with the reaction scheme SiH$_2$I$_2$+RNH$_2$→ (—SiH$_2$NR—) +RNH$_3$I The molar ratio of silylene di-iodide to primary amine should be between 1:3 and 1:3.05 in order to achieve polymers having a useful chain length and the reaction is preferably carried out at a temperature between about —60° C. and 0° C. in an inert environment and in the presence of an inert non-complexing solvent medium such as a hydrocarbon solvent. Residual combined iodine may be removed from the polymeric product by subsequent treatment, if necessary under pressure, with methylamine or dimethylamine, iodine removal generally being essentially complete within half an hour.

We are aware that United States Patent No. 3,007,886 (Parker) sets out a broad generic halosilane formula R$_n$SiHal$_{4-n}$ which, if reacted with a suitable primary amine, may produce the polymers of the present invention when R is hydrogen, Hal is iodine and n is two. However there is no teaching by Parker of such a substitution for R or Hal and all Parker's examples are directed to halosilanes in which at least one R group is an alkyl or aryl group attached to the silicon atom, and the claims of Parker exclude the polymers of the present invention. Further, Parker makes no suggestion that any polymer which may be produced theoretically from his generic halosilane formula might have high thermal stability up to 400° C. and the best Parker polymers are shown to be stable only up to 200° C. In addition, there is no teaching by Parker of the desirability of using the narrowly defined molar proportion of reactants i.e. 3–3.05 moles of primary amine to one mole of silylene di-iodide, which allows excess amine to react with hydrogen iodide produced as the polymerisation proceeds so that this hydrogen iodide is prevented from causing premature termination of polymer chains. In our invention this allows the formation of relatively high molecular weight polymers with good hydrolytic stability and excellent thermal stability.

Particular examples of each of the above-mentioned processes for manufacturing the new polymers will now be given.

Example 1

Bis-(dimethylamino)-silane (0.580 mmole) and anhydrous methylamine (0.569 mmole) are distilled into an evacuated reaction tube of about 20 ml. capacity. The tube is allowed to stand at room temperature for 12 hours. Volatile products from this reaction include hydrogen and dimethylamine. The polymer produced from this reaction is a viscous oil, and is contaminated with a trace of a very involatile liquid which yields hydrogen on hydrolysis.

Example 2

A polymer similar to that produced in Example 1 is formed when n-butylamine is substituted for methylamine in the process described in Example 1.

Example 3

$(SiH_3)_2NPh$ (0.0654 g.; 0.43 mmole) is heated to 325° C. for 4 hrs. Hydrogen (0.00006 g.; 0.03 mmole), silane (0.025 g.; 0.08 mmole) and unchanged $(SiH_3)_2NPh$ (0.404 g.; 0.26 mmole) are the volatile pyrolysis products.

The involatile liquid produced is soluble in diethyl ether and readily hydrolysed by cold 20% KOH solution. The amount of silane produced (0.0025 g.; 0.08 mmole) corresponds to 19% reaction according to the equation:

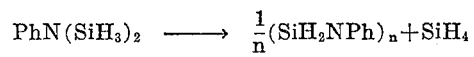

$$PhN(SiH_3)_2 \longrightarrow \frac{1}{n}(SiH_2NPh)_n + SiH_4$$

Example 4

$(SiH_3)_2NPh$ (0.065 g.; 0.42 mmole) is heated to 355° C. for 6 hrs. A yellow viscous liquid is produced, which on removing the volatile materials yields a yellow, semi-crystalline, resinous solid polymer. Hydrogen (0.0003 g.; 0.18 mmole), silane (0.0070 g.; 0.22 mmole) and a negligible amount of a volatile unidentified fraction are produced. The amount of silane corresponds to 51.4% reaction according to the equation:

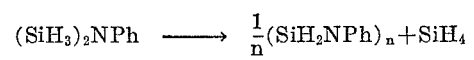

$$(SiH_3)_2NPh \longrightarrow \frac{1}{n}(SiH_2NPh)_n + SiH_4$$

The yellow resinous solid polymer is partially soluble in diethyl ether, benzene, chloroform, methylene chloride, acetone and ethanol. It is resistant to hydrolysis with cold aqueous and ethanolic KOH solution but is partially hydrolysed by hot ethanolic KOH solution, leaving a swollen yellow solid behind. Heating a small amount of the solid polymer on a platinum spatula in a reducing gas flame leaves it unchanged, but it is converted to a charred mass when exposed to an oxidising flame. The infra-red spectra of the solid polymer is similar to that of the polymer of Example 3.

Example 5

$(SiH_3)_2NPH$ (0.057 g.; 0.37 mmole) is heated to 380° C. for 5 hrs. to give an orange-brown, solid polymer. Hydrogen (0.006 g.; 0.30 mmole) and silane (0.0047 g.; 0.15 mmole) are evolved, the proportion of silane corresponding to 39% reaction according to the equation:

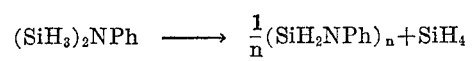

$$(SiH_3)_2NPh \longrightarrow \frac{1}{n}(SiH_2NPh)_n + SiH_4$$

The solid polymer is sparingly soluble in benzene and ethanol, insoluble in diethyl ether, acetone and water. It is resistant to hydrolysis with water and cold 20% KOH solution, but with hot alkali it evolves hydrogen readily. Hydrolysis is, however, incomplete as the solid dissolves only partially in KOH solution.

The reduced solubility of the polymer prepared at 380° C. as compared with the earlier examples is likely to be caused by side reactions leading to some cross-linking of the polymer.

Example 6

Methyldisilylamine vapour at about 1 cm. pressure is streamed through a tube (25 x 2.5 cms.) heated to 525° C. The products are hydrogen, silane, unchanged amine and a mixture of liquids of low volatility, together with an involatile solid. The liquids have the general composition $SiH_3(NMeSiH_2)_xNMeSiH_3$, where $x=1, 2, 3$ upwards.

Example 7

Methyldisilylamine (0.1082 g.; 1.18 mmoles) and methylamine (0.0284 g.; 0.916 mmoles) are distilled into an evacuated reaction tube and the mixture is allowed to stand at −45° C. An increase in vapour pressure of about 9 cm. of mercury is observed over a period of two hours and the reaction mixture is then allowed to stand at −23° C. and finally at room temperature for a total period of about 20 hours until there is no further increase in pressure. In the reaction mixture, hydrogen is found to be present (1 ml. at N.T.P.). The other volatile components are silane (0.0338 g.; 1.06 mmoles) and methylamine (0.020 g.; 0.67 mmole). The residual polymer is a viscous, non-volatile, colourless liquid, subject to hydrolysis by water (rather slowly), dilute NaOH, and concentrated KOH.

This polymer does not sublime in vacuum below the softening point of Pyrex glass, but such heating produces the evolution of a small additional quantity of silane (6 mg.). The recovered polymer is resistant to aqueous hydrolysis and to cold 20% NaOH, but is slowly hydrolysed by hot 20% NaOH. It is almost insoluble in benzene and chloroform.

Example 8

Methyldisilylamine (0.1565 g.) and methylamine (30 mg.) are distilled into a reaction tube and allowed to stand at room temperature for 392 hours, and then at 50° C. for about 4 hours. When the reaction tube is opened to a vacuum system a trace of hydrogen is found to be present (0.0008 g.; 0.04 mmole). The other volatile components, fractionated through −112° C., are silane (0.0639 g.) and methylamine (0.0250 g.). The polymeric product is a viscous liquid which upon repeated treatment with dry cyclohexane gives a semi-crystalline solid the molecular weight of which is 1,150 (measured by the lowering in vapour pressure of pure cyclohexane solutions at 0° C.). The total yield of polymer is 0.0852 g. or 92%.

Example 9

Methyldisilylamine (0.1109 g.; 1.22 mmoles) and trimethylamine (0.0342 g.; 0.58 mmole) are distilled into an evacuated reaction tube and the tube is sealed. The reaction tube is heated to 107° C. over a period of 2 hours, allowed to cool to room temperature and opened to a vacuum system. A very small amount of hydrogen is formed and the other volatile products of the reaction are repeatedly fractionated through −134° C. The vapour not condensed at this temperature is silane. The liquid fraction at this temperature is a mixture of recovered methyldisilylamine and trimethylamine. The polymer product is a solid, insoluble in chloroform but soluble in cyclohexane which is resistant to cold water, but which evolves amines with cold 20% NaOH.

Example 10

Methyldisilylamine (0.0703 g.; 0.77 mmole) and ammonia (0.0185 g.; 1.1 mmole) are sealed into an evacuated reaction vessel at −45° C. and the mixture allowed to warm to room temperature when the liquid becomes viscous and evolves gas vigorously, setting to a solid after 45 minutes.

After two weeks at room temperature the volatile products gave the analysis: hydrogen (0.0045 g.; 2.25 mmoles); methylamine (0.0167 g.; 0.54 mmole); and ammonia (0.0071 g.; 0.43 mmole). The polymeric product is a white cross-linked solid, insoluble in organic solvents.

*Example 11*

Disilylaniline (0.0498 g.; 0.33 mmole) and aniline (0.0262 g.; 0.28 mmole) are distilled successively in vacuo into a reaction vessel which is then sealed and allowed to stand at room temperature for four weeks. After this time, the volatile products are hydrogen (0.005 mmole), silane (0.16 mmole) and a mixture of aniline and unreacted disilylaniline (0.0372 g.), which on hydrolysis was shown to contain 0.0179 g. of disilylaniline. The polymer product remains in the reaction vessel as a colourless, rather viscous liquid.

*Example 12*

Methyldisilylamine vapour at about 10 cms. pressure is contained in an air-cooled quartz reaction vessel attached to the vacuum system and irradiated for 30 mins. with a 1 kw. ultra-violet lamp placed 1.5 cm. away.

The product of a number of runs in which 0.1296 g. of methyldisilylamine was decomposed was 0.0170 g. of $(SiH_3—NMe—SiH_2)_2NMe$ together with a smaller quantity of a mixture of viscous liquids of low volatility. The volatile products were silane, hydrogen and unreacted methyldisilylamine.

*Example 13*

Silylene iodide (1.018 g.) and n-hexane (5 ml.) (dried over calcium hydride for some days) are distilled into one bulb of an evacuated reaction vessel. This bulb is connected, via a capillary break-seal opener, to a second bulb which contains anhydrous methylamine (0.345 g.) dissolved in n-hexane (5 ml.). The two bulbs are warmed to about 0° C., and the whole reaction vessel is shaken to ensure that each solution is homogeneous. Both are cooled in a chlorobenzene slush bath (−46°), the connecting seal is broken, and the methylamine solution poured slowly into the silylene iodide solution, with constant shaking. A copious white solid is produced; this is allowed to stand at room temperature for one hour.

The reaction vessel is attached to the vacuum system, and all volatile materials removed. These include solvent, silane and unreacted methylamine.

In order to remove traces of iodine from the polymer, anhydrous dimethylamine (0.276 g.) is introduced into the reaction vessel, which is sealed and allowed to stand at room temperature for 30 mins.

The mixture of involatile products is transferred to a dry-box filled with oxygen-free nitrogen, mixed with anhydrous diethylamine (ca. 10 ml.) and filtered. The filtrate contains amine hydroiodide and some low molecular weight polymer, while higher molecular weight polymer remains as a white powdery solid.

*Example 14*

The reaction described in Example 13 is carried out with an equivalent molar proportion of n-butylamine in place of methylamine, and the same type of polymer product is produced.

*Example 15*

Silylene iodide (0.5415 g.; 1.9 mmoles), dry benzene (12 ml.) and aniline (0.5060 g.; 5.4 mmoles) are distilled into an all-glass reaction vessel. Silylene iodide is in 3% excess to the amount demanded by the equation:

$$SiH_2I_2 + 3PhNH_2 \rightarrow \frac{1}{n}(SiH_2NPh)_n + 2PhNH_2 \cdot HI$$

The reaction mixture is allowed to stand at room temperature for twelve hours. The crude solid polymer produced is dissolved in benzene and filtered through the sintered glass filter to give a clear solution of the polymer in benzene, the insoluble aniline hydroiodide remaining on the filter. This procedure is repeated to ensure complete extraction of the polymer and the benzene is finally distilled away to leave a white granular polymer solid. No silylene iodide or iodine is detected in the products and analysis by acid hydrolysis gives the following results:

Found: Si, 21.3%; $PhNH_2$, 78.0%.
Calculated for $—SiH_2NPh—$: Si, 23.2%; $PhNH_2$, 76.8%.

The polymer solid is soluble in benzene, chloroform, acetone and ethanol and becomes glass-like when heated to 325° C. and 385° C. for 5 hrs. in two separate experiments. No hydrogen is produced by the heating and the infra-red spectrum of the heated product is similar to that of the original polymer. The solubility of the polymer in benzene after heating appears to decrease slightly.

The polymer solid is found to be resistant to hydrolysis with cold 20% KOH solution, but evolves hydrogen with hot 20% alkali. Molecular weight determinations on samples of the polymer give values from 1840 to 5776.

We claim:
1. Polymers having repeating units of structural formula

$$—SiH_2—NR—$$

wherein R represents a lower alkyl group containing up to six carbon atoms or an aryl group containing up to seven carbon atoms, said polymers being thermally stable up to about 400° C.

2. Polymers according to claim 1 where R is selected from the group consisting of methyl, n-butyl and phenyl.

3. Polymers according to claim 1 consisting essentially of chains containing at least 20 repeating units of the formula specified.

4. Process for preparing polymers having repeating units of the structural formula $$—SiH_2—NR—$$

where R represents a lower alkyl group containing up to six carbon atoms or an aryl group containing up to seven carbon atoms, which comprises reacting one molar proportion of silylene iodide with 3 to 3.05 molar proportions of a primary amine of formula $RNH_2$, wherein R is as hereinbefore defined, at a temperature from about −60° to about 25° C. in an inert environment and in the presence of an inert non-complexing solvent medium.

5. Process according to claim 4 wherein said primary amine is selected from the group consisting of methylamine, n-butylamine and aniline.

6. Process according to claim 4 wherein any iodine present in the resulting polymer chain is removed by treatment with an amine selected from the group consisting of $R'NH_2$ and $R'_2NH$ wherein R' is lower alkyl.

7. Process according to claim 5 wherein any iodine present in the resulting polymer chain is removed by treatment with dimethylamine.

8. Process for preparing polymers having repeating units of the structural formula $$—SiH_2—NR—$$

wherein R represents a lower alkyl group containing up to six carbon atoms or an aryl group containing up to seven carbon atoms, which comprises reacting a bis-(diorganoamino)-silane of formula $$SiH_2(NR'_2)_2$$

wherein R represents a lower alkyl group containing up to six carbon atoms or an aryl group containing up to seven carbon atoms, with a substantially equimolar proportion of a primary amine of formula $RNH_2$ wherein R is as hereinbefore defined, said reaction being carried out in an inert environment and at a temperature between ambient temperature and about 120° C.

9. Process according to claim 8 in which the reaction temperature is between 50° and 70° C.

10. Process according to claim 8 in which R and R' are organic radicals selected from the group consisting of methyl, n-butyl and phenyl.

11. Process for preparing polymers having repeating units of the structural formula $$-SiH_2-NR-$$

wherein R represents a lower alkyl group containing up to six carbon atoms or an aryl group containing up to seven carbon atoms, which comprises heating an organo-disilylamine having the structural formula $$(SiH_3)_2NR$$

wherein R is as hereinbefore defined, at a temperature between about 300° and 600° C.

12. Process according to claim 11 in which said organodisilylamine is heated between about 350° and 450° C.

13. Process according to claim 11 in which R is a methyl or a phenyl group.

References Cited by the Examiner
UNITED STATES PATENTS
3,234,148   2·1966   Aylett et al. _____ 260—2

LEON J. BERCOVITZ, *Primary Examiner.*

M. I. MARQUIS, *Assistant Examiner.*